Sept. 24, 1929.  H. M. PARVIN  1,729,121
TUBE REPAIRING CLAMP
Filed July 20, 1928   2 Sheets-Sheet 1
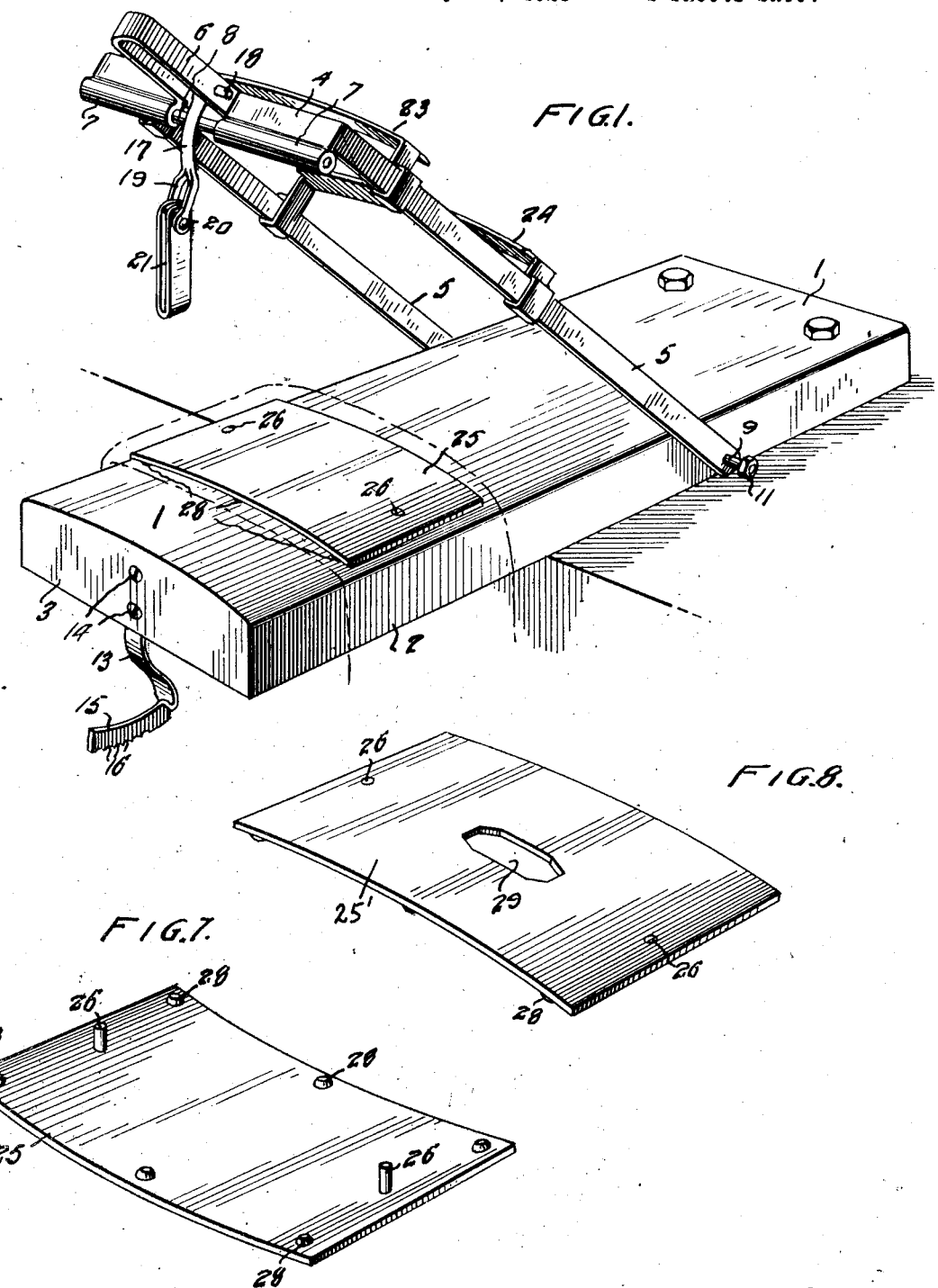
Inventor
HENRY M. PARVIN
By Lester S. Sargent
Attorney Sept. 24, 1929.  H. M. PARVIN  1,729,121
TUBE REPAIRING CLAMP
Filed July 20, 1928   2 Sheets-Sheet 2
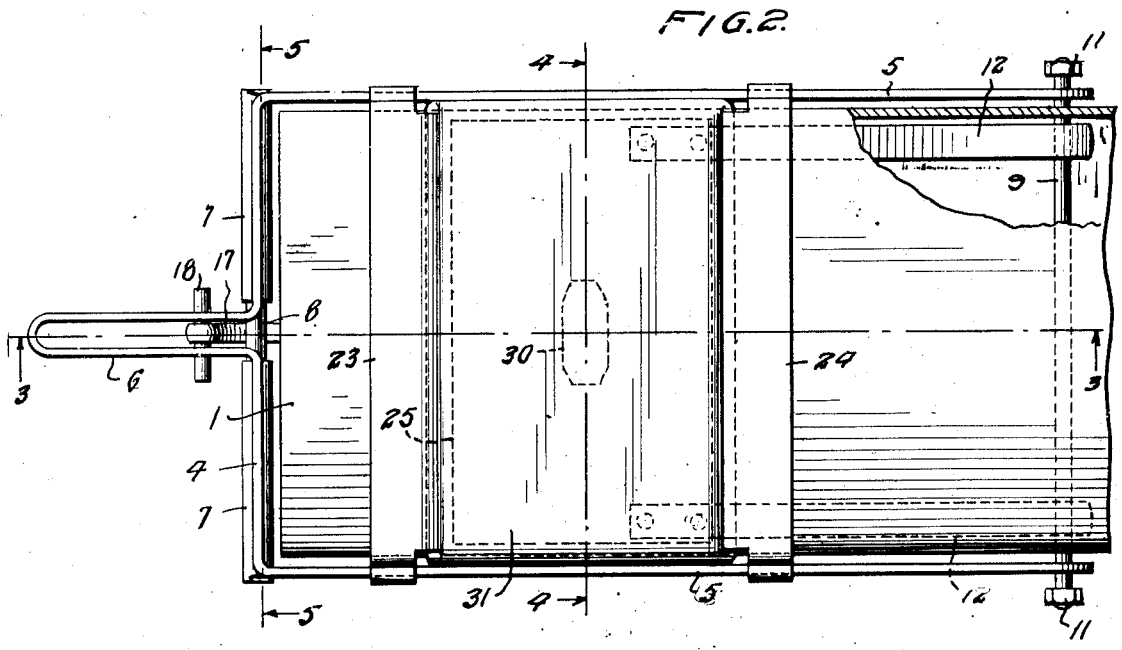
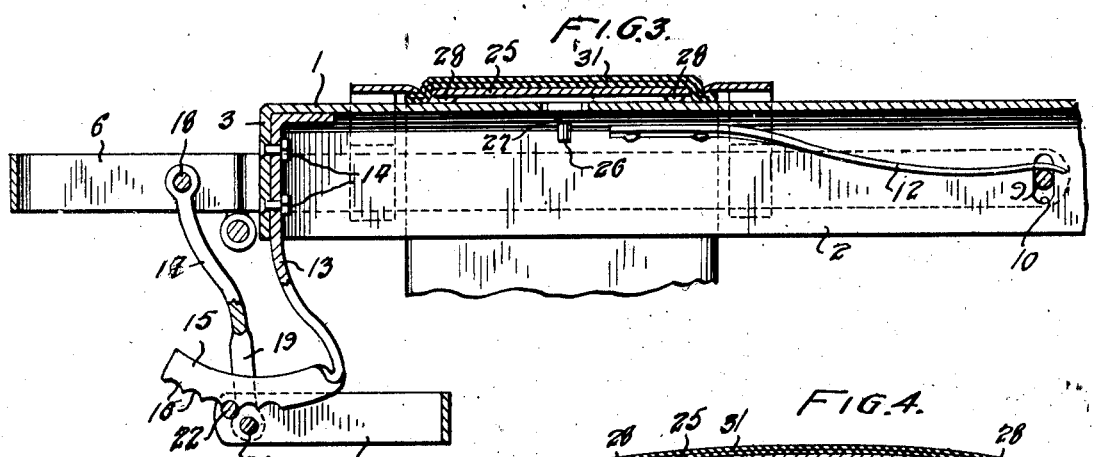
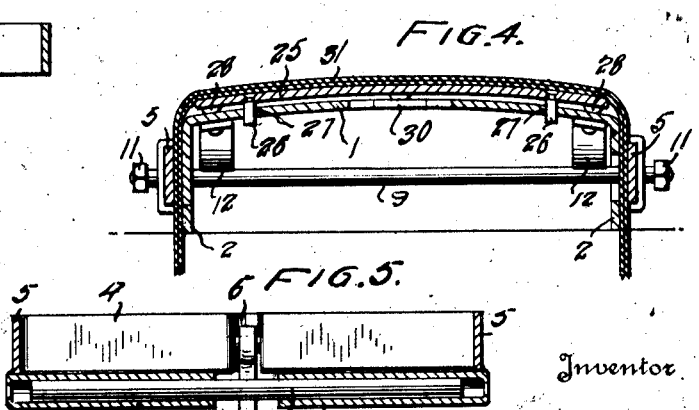
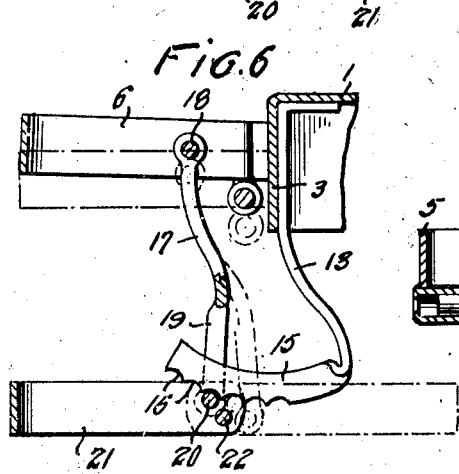
Inventor
Henry M. Parvin
By Lester L. Sargent
Attorney Patented Sept. 24, 1929

1,729,121

UNITED STATES PATENT OFFICE

HENRY M. PARVIN, OF COLFAX, WASHINGTON

TUBE-REPAIRING CLAMP

Application filed July 20, 1928. Serial No. 294,167.

The object of my invention is to provide a novel device to hold tire tubes in place while they are being repaired and to provide novel means for conveniently and securely stretching the tube and firmly holding it while the workman is affixing the patch to the tube.

I attain these and other objects of my invention by the device illustrated in the accompanying drawings, in which,—

Figure 1 is a perspective view of my invention ready for use;

Fig. 2 is a top plan view of same;

Fig. 3 is a longitudinal section on line 3—3 of Fig. 2;

Fig. 4 is a transverse section on line 4—4 of Fig. 2;

Fig. 5 is a section on line 5—5 of Fig. 2;

Fig. 6 is a detail longitudinal section with the handle member 21 in reverse position from that shown in Fig. 3;

Fig. 7 is a detail perspective view of the under side of the plate 25; and

Fig. 8 is a perspective view of the top side of a modified plate 25' having the slot 29.

Like numerals indicate like parts in each of the several views.

Referring to the accompanying drawings I provide a suitable base plate 1 having the vertical sides 2 and the vertical end 3. Affixed to the end 3 is a depending arm 13 which terminates in a segment 15 having the rigid teeth 16, as shown in Fig. 1. The sides 2 of base plate 1 are provided with elongated slots 10, as shown in Fig. 3 in which a rod 9 is mounted and which rod is engaged by the spring 12 affixed to the under side of base plate 1, as shown in Fig. 3. I provide nuts 11 on the ends of rod 9, as shown. Mounted on the ends of rod 9 are the side bars 5 of the clamp member. The entire clamp member consists of the side bars 5, and bars 4 and handles 6, the end portions 4 also having the integral cylindrical sockets 7 which carry the rod 8, while the handle carries a pin 18 on which the link or handle 17 is pivotally mounted. The link 17 has a bifurcated end 19 which in turn carries the U-shaped link handle or lever 21, the pin or pivot 20 connecting said members being offset from the center of member 21, as shown in Figs. 3 and 6, the handle member 21 also carrying a second offset pin 20 adapted to engage the recesses of the tooth segment 15, as shown in the drawing. Slidably mounted on the side bars 5 are similar adjustable clamps 23 and 24 which are adapted to engage the edges of the tire tube 31 in the manner illustrated in Fig. 3 to firmly hold the same over the plate 25 (or 25' as the case may be) while the tube is being repaired. I provide a removable plate 25 having studs 26 adapted to seat in corresponding apertures 27 in the base plate 1 to hold the plate in position and also having projections 28 to slightly raise the removable plate from the base plate. In the modified plate 25', illustrated in Fig. 8, I provide a slot 29, the purpose of which will hereinafter be described.

The tube is laid on the movable plate 25 (or 25') and the clamp is brought down on it and fastened by the adjustable handle elements 17 and 21. This stretches the tube tight and allows the workman to place the patch on and roll it in order to make it stick closely. There are several plates of various sizes to care for different size tire tubes. Some of the plates are made with holes in the center (as illustrated in Fig. 8) in order to allow the valve stem to stick through in case the repair has to be made near the stem.

The special features of my invention consist in the offset adjustable clamps which make it possible to draw the tube tightly over the plate, thereby stretching it considerably sidewise and at the same time not binding it along the sides of the device. The clamps 24 and 25 are movable along the side bars 5 in order to take any size tube. The pivoted ends of the side bars are not fixed rigidly to the frame but are resiliently or adjustably mounted by means of the engagement of springs 12, affixed to the under side of the base plate and engaging the rod 9 on which the side bars 5 are pivoted, the rod 9 being movable in the elongated slots 10 of the sides 2 of the base plate 1. The purpose of this is to allow the side bars to hold the adjustable clamps in a position to move up and down slightly in order that the front and back clamps may hold the tube with equal pressure.

A novel feature of my invention is the front end of the side bars where the handle is fastened and to which the clamp is attached to draw down the tube clamps and tighten on the segment at the bottom. This consists of the hollow cylindrical sockets in which is inserted a rod. The purpose of this is to permit the side bars and the two clamps to spread sidewise and at the same time being rigid so far as down pressure is concerned. If these were rigid bars the side bars and the clamps could not spread without distortion. The method of tightening down the clamps in front of the device by the handle member 21 with the offset pins 20 and 22 is also a novel feature of my invention. The device may be bolted to a bench in any suitable manner, such as illustrated in Fig. 1.

What I claim is:

1. In a device of the class described, the combination of a base plate having a slot therethrough and having vertical sides, side clamp bars pivotally and adjustably mounted on the side portions of the base plate, a handle for operating the side clamp bars, a depending arm affixed to the end of the base plate, said depending arm having a toothed segment portion, a link pivotally attached to the handle of the clamp bars, a handle pivotally connected to the link, a pin offset from the pivot connecting the handle to the link, said pin being adapted to engage the toothed segment whereby to tighten the side clamp bars over a tire tube to be repaired, adjustable clamp members slidably mounted on the clamp bars and adapted to engage the edges of the tire tube to stretch the tire sidewise, and a removable plate over which the tube is placed and clamped for repairing, said plate having a slot therethrough alined with the slot through the base plate.

2. In a device of the class described, the combination of a base plate having a slot therethrough and having vertical sides, side clamp bars pivotally mounted on the side portions of the base plate, the base plate having vertical extending elongated slots in its vertical sides, a rod extending through said slots and to the ends of which rod the side clamp bars are pivotally connected, and springs attached to the underside of the base plate and having their free ends resiliently engaging the aforesaid transverse rod, a handle for operating the side clamp bars, a depending arm affixed to the end of the base plate, said depending arm having a toothed segment portion, a link pivotally attached to the handle of the clamp bars, a handle pivotally connected to the link, a pin offset from the pivot connecting the handle to the link, said pin being adapted to engage the toothed segment whereby to tighten the side clamp bars over a tire tube to be repaired, adjustable clamp members slidably mounted on the clamp bars and adapted to engage the edges of the tire tube to stretch the tire sidewise, and a removable plate over which the tube is placed and clamped for repairing.

3. In a device of the class described, the combination of a base plate having a slot therethrough and having vertical sides, side clamp bars pivotally and adjustably mounted on the side portions of the base plate, a handle for operating the side clamp bars, a depending arm affixed to the end of the base plate, said depending arm having a toothed segment portion, a link pivotally attached to the handle of the clamp bars, a handle pivotally connected to the link, a pin offset from the pivot connecting the handle to the link, said pin being adapted to engage the toothed segment whereby to tighten the side clamp bars over a tire tube to be repaired, adjustable clamp members slidably mounted on the clamp bars and adapted to engage the edges of the tire tube to stretch the tube sidewise, a removable plate over which the tube is placed and clamped for repairing, cylindrical sockets on the end of the side clamp bars, and a rod mounted in said cylindrical sockets and extending across the end of the side clamp bars.

4. In a device of the class described, the combination of a base plate having an opening therethrough, a clamp device pivotally and resiliently mounted on the base plate and having side bars extending parallel with and close to downturned edge portions of the base plate, said clamp device including a rigid handle member, a pivotally mounted handle member linked to the rigid handle member, said pivotally mounted handle member having a transverse pin offset from its pivot connecting element, an arm affixed to the connecting element, an arm affixed to the base plate and depending therefrom, said arm having a toothed segment portion with which the pin of the handle member is engageable for tightening the side clamp bars down to securely hold a tire tube over the base plate.

5. In a device of the class described, the combination of a base plate having an opening therethrough, a clamp device pivotally and resiliently mounted on the base plate and having side bars extending parallel with and close to downturned edge portions of the base plate, said clamp device including a rigid handle member, a pivotally mounted handle member linked to the rigid handle member, said pivotally mounted handle member having a transverse pin offset from its pivot connecting element, an arm affixed to the base plate and depending therefrom, said arm having a toothed segment portion with which the pin of the handle member is engageable for tightening the side clamp bars down to securely hold a tire tube over the base plate, a removable plate detachably engaged on the base plate and over which the tire tube is placed, and side clamp plates slidably mounted on the side clamp bars and engageable with the edges of the tire tube to stretch the tire tube sidewise over the removable plate for convenience in repairing the tire tube.

HENRY M. PARVIN.